United States Patent [19]

Prochazka

[11] 3,853,566

[45] Dec. 10, 1974

[54] HOT PRESSED SILICON CARBIDE

[75] Inventor: Svante Prochazka, Ballston Lake, N.Y.

[73] Assignee: General Electric Company, Schenectady, N.Y.

[22] Filed: Dec. 21, 1972

[21] Appl. No.: 317,426

[52] U.S. Cl.............................. 106/44, 264/65
[51] Int. Cl............................... C04b 35/14
[58] Field of Search......... 106/44; 29/182.7; 264/65

[56] References Cited
UNITED STATES PATENTS

| | | | |
|---|---|---|---|
| 2,109,246 | 2/1938 | Boyer | 106/44 |
| 2,805,197 | 9/1957 | Thibault et al. | 106/44 X |
| 2,908,553 | 10/1959 | Frank | 106/44 X |
| 2,916,460 | 12/1959 | van der Beck | 106/44 UX |
| 2,992,960 | 7/1961 | Leeg et al. | 106/44 X |
| 3,175,884 | 3/1965 | Kuhn | 106/44 |
| 3,649,310 | 3/1972 | Yates | 106/44 |
| 3,649,342 | 3/1972 | Bartlett | 106/44 |
| 3,725,099 | 4/1973 | Nozik | 106/44 X |

OTHER PUBLICATIONS

Schwarzkopf, et al., Refractory Hard Metals–1953, pub. MacMillan, TN677S36, p. 375.

Primary Examiner—Helen M. McCarthy
Attorney, Agent, or Firm—Gerhard K. Adam; Joseph T. Cohen; Jerome C. Squillaro

[57] ABSTRACT

A dense silicon carbide ceramic is disclosed which is prepared by forming a homogeneous dispersion of a submicron powder of silicon carbide and a boron containing additive wherein the amount of boron additive is equivalent to 0.5–3.0 parts by weight of boron per 100 parts of silicon carbide and hot pressing the dispersion at a temperature of about 1,900–2,000° C. and at a pressure of about 5,000–10,000 psi for a sufficient time whereby a dense, substantially nonporous ceramic is formed.

3 Claims, No Drawings

HOT PRESSED SILICON CARBIDE

The chemical and physical properties of silicon carbide make it an excellent material for high temperature structural applications. These properties include good oxidation resistance and corrosion behavior, good heat transfer coefficients, low expansion coefficient, high thermal shock resistance and high strengths at elevated temperature. This unique combination of properties suggests the use of silicon carbide as check valves for handling corrosive liquids, linings of ball mills, heat exchangers for high temperature furnaces, pumps for die casting machines and combustion tubes.

Heretofore, dense silicon carbide bodies were prepared by reaction bonding, chemical vapor deposition and by hot pressing. The reaction bonding procedure involves hydrostatically pressing or extruding a mixture of silicon carbide, graphite and a binder into a shaped article such as a rod. The rod is then heated in a crucible containing silicon, which upon melting reacts with the graphite to form more silicon carbide. The silicon carbide formed by the reaction acts to bond the microstructure together. In chemical vapor deposition, methyltrichlorosilane vapor is mixed with hydrogen and passed into a reaction chamber containing a heated graphite rod. The silane decomposes on contact with the hot rod and silicon carbide is deposited. The third method is hot pressing which has been used to produce small specimens under closely controlled conditions.

Unfortunately, silicon carbide is not easily sintered to densities approaching the theoretical density of 3.21 grams per cubic centimeter. A method of hot pressing silicon carbide to uniform densities on the order of 98% of the theoretical density with slight addition of aluminum and iron aiding in densification is disclosed by Alliegro, et al., J. Ceram. Soc., Vol. 39, No. 11, Nov. 1956, Pages 386–389. They found that dense hot pressed silicon carbide containing 1% by weight of aluminum had a modulus of rupture of 54,000 psi at room temperature and 70,000 psi at 1,371° C. However, they also reported that the density of hot pressed silicon carbide containing 3 mole % boron was substantially equivalent, i.e., 2.7 gm. per cc., to silicon carbide obtainable without impurities or additives.

In accordance with the present invention, I have discovered a method of making a dense silicon carbide ceramic by the steps of forming a homogeneous dispersion of a submicron powder of silicon carbide and a boron containing additive, the amount of the additive being equivalent to 0.5–3.0 parts by weight of boron per 100 parts of silicon carbide, and hot pressing the dispersion at a temperature of about 1,900°–2,000° C. and at a pressure of about 5,000–10,000 psi for a sufficient time to produce a dense, nonporous silicon carbide ceramic. The resulting ceramic has a density of at least 98% of the theoretical density for silicon carbide and is suitable as an engineering material, such as for example in high temperature gas turbine applications.

It is essential that the powder dispersion is a mixture of submicron particle size powders in order to obtain the high densities and strength upon hot pressing. These may be obtained by different techniques as for instance by direct synthesis of a powder mixture of elements or by carbon reduction of silicon oxide.

The boron containing additive is also in the form of a submicron sized powder and may be either as elemental boron or boron carbide. In order to obtain densification the amount of the boron containing additive is critical and should be in the range of 0.5–3.0 parts by weight of boron per 100 parts by weight of silicon carbide. When less than 0.5 part by weight is used the full densification is not obtained; whereas when more than 3.0 parts by weight are used exaggerated grain growth occurs together with loss of strength and oxidation resistance. The optimum amount is about 1 part by weight per 100 parts of silicon carbide.

In order to form a homogeneous dispersion, the submicron powders of the SiC and the boron containing additive are subject to a mixing and dispersing procedure prior to hot pressing. This processing step may be carried out by ball milling in a suitable container with tungsten carbide balls. Ball milling also considerably increases the achievable green density on preparing the powders. A value of green density 1.6 g./cc. is indicative of satisfactory processing.

There are several critical parameters during hot-pressing which control the densification and microstructure of the final product. The most important of these are pressure, temperature, and time at the temperature. While they will be discussed individually, it is readily apparent that these conditions are interdependent.

The pressure range useful for full densification is between about 5,000 to 10,000 psi. For general uses and for larger articles, the pressure is limited by available die materials and design. Thus for solid graphite dies the upper limit is about 5,000 psi and for graphite fiber-wound dies the upper limit is about 10,000 psi. It is advantageous to use a pressure close to the upper limit of 10,000 psi because the application of high pressure makes it possible to keep the temperature low enough to control the grain growth. Low pressures, below 5,000 psi, require the use of higher sintering temperatures or longer pressing time which will induce exaggerated grain growth.

The first indication of densification on heating up is obtained at or slightly above 1,600° C. which may be detected by the motion of the press ram. However, for all practical purposes high density cannot be obtained below 1,900° C. This limitation is imposed by the applicable pressure. At 10,000 psi, and 1,900° C. a 96% relative density is obtained in 10 minutes and a 98% relative density is obtained in 30 minutes. By increasing the temperature to 1,950° C. and maintaining the pressure at 10,000 psi for 30 minutes, a density 3.20 g./cm.$^2$ is reached corresponding to 99.6% of the theoretical. This pressing, when investigated metallographically, is pore-free. The microstructure obtained on these latter pressing conditions is uniform and fine-grained composed of about 3 microns equiaxed grains. At 2,000° C. and 10,000 psi for 10 minutes the density obtained is still high, near theoretical, but the grain morphology changes. The grains become elongated and isolated large tabular crystals form in the fine grain matrix. This exaggerated grain growth is more pronounced as the pressing time is extended or as the temperature is further increased. For instance, at 2,100° C. and 10,000 psi, tubular crystals as long as 1 mm. grow in 10 minutes and also large pores develop and consequently the density drops to about 3.15 g./cc. (98% of theoretical density). Thus, at the applied pressure, there is a fairly narrow temperature region from about 1,900° to 2,000° C., preferably near 1,950°, at which full densification along with a uniform microstructure can be obtained.

The dramatic exaggerated grain growth may be attributed to the formation of silicon as a result of reaction of small amounts of silica contained in SiC according to the following reaction:

$$SiO_2 + 2SiC \rightarrow 3Si + 2CO$$

The time dependence in SiC densification, as in other sintering phenomena, is less significant in that pressing time cannot satisfactorily compensate for either decreased temperature or pressure. For instance, sintering at 1,900° and 10,000 psi yields 96% density in 10 minutes, and 98% in 30 minutes, while a total hold of 100 minutes brings only a marginal improvement. The sintering is usually complete within a time range of 10–60 minutes.

During hot pressing an atmosphere must be used which is inert to the silicon carbide. Thus, oxidizing atmospheres such as air cannot be used since they would tend to oxidize the silicon carbide to silica, interfere with sintering and degrade the high temperature properties. Useful inert atmospheres including argon, helium, and nitrogen.

As revealed by X-ray diffraction, electron diffraction and metallography, the fine grained SiC is composed of $\beta$-SiC and a minor, varying amount of $\beta$-SiC (6H). There is also a small amount of silica located at grain edges, typically about one volume percent. No separate boron containing phase was detected which suggests that boron formed a solid solution with SiC. One of the main features of our invention is the preparation of an essentially single phase, pore-free fine grained silicon carbide ceramic with outstanding mechanical and thermal properties which are essential for high temperature gas turbine application. The density of the product is at least 98% of the theoretical density.

My invention is further illustrated by the following examples:

EXAMPLE I

A high grade commercial silicon carbide powder (Norton E277) was dispersed in distilled water to obtain a 2% suspension. The dispersion was agitated for 2 hours by a propeller blender and left to settle for a time corresponding to the sedimentation time of 1 micron particles of SiC calculated from Stokes law. The liquid was drained off from the sediment which was then redispersed in the same volume of distilled water and the sedimentation was repeated.

The liquids from both sedimentations were jointly evaporated and yielded 8% of submicron SiC powder based on the initial weight of SiC used for fractionation. This material was characterized with the following data:

Spectrographic Analysis

| Elements | PPM |
|---|---|
| Al | 1,600 |
| Fe | 1,500 |
| Cr | 40 |
| V | 350 |
| Ti | 230 |
| Zr | 70 |
| oxygen % | 4.2 |

Pycnometric density : 3.13 g./cc.
Spec. Surface Area : 18.2 m.²/g.
Mean Average Particle Size : 0.1$\mu$

EXAMPLE II

To submicron size SiC powder, as prepared in Example I, was added 3.6 parts by weight per 100 parts of SiC of submicron particle size boron carbide prepared by fractionation of a commercially available product in the same way as the SiC. A dispersion was formed of 50 g. of the mixture in 100 g. water by tumbling in a plastic jar with ¼ inch tungsten carbide balls. The slurry was dried, the powder obtained was sifted through a 40 mesh sieve and charged in a 1 inch bore graphite die.

A 1 inch diameter sample was hot pressed under an atmosphere of 1 mm. Hg pressure of argon at 1,950° C. and 5,000 psi for 30 minutes. Full pressure was applied at 1,700° C. on heating up and released at 1,700° on cooling. The pressing had a density 3.18 g./cc. (99% of theoretical density), less than 1% residual porosity and an average grain size of 4 microns. Room temperature strength in 3 point bending on a 0.625 span of as machined test bars 100 mil square cross section and 1 inch long was 80,000 psi.

EXAMPLE III

To the submicron size SiC powder, as prepared in Example I, was added 1 part by weight per 100 parts of SiC of submicron ball milled amorphous boron and mixed with equal weight of carbon tetrachloride to form a thin slurry. The slurry was milled in a plastic jar with tungsten carbide balls for 5 hours. The liquid was then allowed to dry off and the powder was fed into a graphite die. The die was subsequently inductively heated in an atmosphere of 1 mm. argon to 1,750° C. under a pressure of 1,000 psi for 1 hour. After this temperature was achieved, the load was increased to obtain 10,000 psi and the temperature was further increased to 1,950 in 30 minutes and held at this temperature for another 30 minutes. The atmosphere was maintained at approximately 1 mm. Hg of argon. Thereafter, the temperature was gradually reduced maintaining the full load on the specimen. When 1,700° C. was reached, both load and power was shut off and the system allowed to cool off.

Test bars having a cross section of 100 mils square and 1 inch long were prepared and ground with a 200 mesh diamond wheel. The product having a density of 3.20 g./cc. was characterized using conventional techniques and the properties found were as follows:

| Strength (3 point bending) | |
|---|---|
| Room Temp. | 80,000 psi |
| 1,300° C. | 80,000 psi |
| 1,400° C. | 80,000 psi |
| 1,500° C. | 64,000 psi |
| 1,600° C. | 44,000 psi |

| Time to fracture at 1,600° C. and | |
|---|---|
| 25,000 psi | >4,500 min. |
| 30,000 psi | >4,500 min. |
| 35,000 psi | ~40 min. |

Creep rate at 1,620° C. and 25,000 psi (bending)

1.5 × 10⁻⁹ cm./cm. sec.

Oxidation rate in air at 1,600° C.

0.5 mg./cm.² weight gain in 64 hours

This data indicates that high strengths were obtained especially at the higher temperatures and that these results were substantially better than those reported in the Alligero, et al., reference discussed above.

It will be appreciated that the invention is not limited to the specific details shown in the examples and illustrations and that various modifications may be made within the ordinary skill in the art without departing from the spirit and scope of the invention.

I claim:

1. A dense hot pressed silicon carbide ceramic body consisting essentially of β-silicon carbide and a boron containing additive selected from the group consisting of boron and boron carbide wherein the amount of the boron additive is equivalent to 0.5–3.0 parts by weight of boron per 100 parts of silicon carbide, said boron additive being in solid solution with the silicon carbide, the ceramic being substantially pore free and having a density of at least 98% of the theoretical density for silicon carbide and a fine-grained microstructure.

2. The ceramic of claim 1, wherein the additive is boron.

3. The ceramic of claim 1, wherein the additive is boron carbide.

* * * * *